United States Patent
Feng et al.

(10) Patent No.: US 10,845,884 B2
(45) Date of Patent: Nov. 24, 2020

(54) DETECTING INADVERTENT GESTURE CONTROLS

(71) Applicant: Lenovo (Singapore) Pte. Ltd., Singapore (SG)

(72) Inventors: Xin Feng, Morrisville, NC (US); Robert James Kapinos, Durham, NC (US); Corinna Paine Proctor, Raleigh, NC (US); Vicki West Chanon, Durham, NC (US); Paul Hilburger, Cary, NC (US)

(73) Assignee: Lenovo (Singapore) Pte. Ltd., Singapore (SG)

(\*) Notice: Subject to any disclaimer, the term of this patent is extended or adjusted under 35 U.S.C. 154(b) by 0 days.

(21) Appl. No.: 14/276,518

(22) Filed: May 13, 2014

(65) Prior Publication Data

US 2015/0331534 A1 Nov. 19, 2015

(51) Int. Cl.
 *G06F 3/01* (2006.01)
 *G06F 3/0488* (2013.01)

(52) U.S. Cl.
 CPC ............ *G06F 3/017* (2013.01); *G06F 3/0488* (2013.01)

(58) Field of Classification Search
 CPC ...... G06F 3/0304; G06F 3/017; G06F 3/0416; G06F 3/01; G06F 3/041; G06F 3/0488
 See application file for complete search history.

(56) References Cited

U.S. PATENT DOCUMENTS

| | | | | |
|---|---|---|---|---|
| 7,028,269 | B1* | 4/2006 | Cohen-Solal | H04N 5/23203 348/E5.043 |
| 8,294,105 | B2* | 10/2012 | Alameh | H03K 17/9631 250/344 |
| 8,457,353 | B2* | 6/2013 | Reville | G06F 3/011 382/103 |
| 8,547,354 | B2* | 10/2013 | Koch | G06F 3/04886 178/18.01 |
| 8,674,900 | B2* | 3/2014 | Park | G06F 3/1423 345/1.1 |
| 9,104,240 | B2* | 8/2015 | Burr | G06K 9/00355 |
| 9,575,708 | B2* | 2/2017 | Park | G06F 3/1446 |
| 9,633,497 | B2* | 4/2017 | Menzel | G07C 9/00111 |
| 10,139,906 | B1* | 11/2018 | Bai | G06F 3/03547 |
| 10,394,330 | B2* | 8/2019 | Iwasaki | G06F 1/1694 |
| 2003/0132950 | A1* | 7/2003 | Surucu | G06F 1/1626 715/700 |
| 2005/0212749 | A1* | 9/2005 | Marvit | G06F 1/1613 345/156 |
| 2006/0256082 | A1* | 11/2006 | Cho | G06F 1/1626 345/156 |
| 2008/0267447 | A1* | 10/2008 | Kelusky | G06F 19/3481 382/100 |
| 2009/0027337 | A1* | 1/2009 | Hildreth | G06F 3/011 345/158 |
| 2009/0174679 | A1* | 7/2009 | Westerman | G06F 3/03547 345/173 |
| 2009/0217211 | A1* | 8/2009 | Hildreth | G06F 3/017 715/863 |

(Continued)

*Primary Examiner* — Sejoon Ahn
(74) *Attorney, Agent, or Firm* — Ference & Associates LLC

(57) ABSTRACT

An embodiment provides a method, including: capturing, using an image capture device, image data; analyzing, using a processor, the image data to identify a gesture control; determining, using a processor, the gesture control was inadvertent; and disregarding, using a processor, the gesture control. Other aspects are described and claimed.

20 Claims, 5 Drawing Sheets

(56) References Cited

U.S. PATENT DOCUMENTS

| | | | |
|---|---|---|---|
| 2009/0265671 A1* | 10/2009 | Sachs | G06F 3/017 715/863 |
| 2009/0303204 A1* | 12/2009 | Nasiri | A63F 13/06 345/184 |
| 2009/0315740 A1* | 12/2009 | Hildreth | G06F 3/017 341/20 |
| 2009/0324008 A1* | 12/2009 | Kongqiao | G06F 3/017 382/103 |
| 2010/0225595 A1* | 9/2010 | Hodges | G06F 3/0425 345/173 |
| 2010/0225734 A1* | 9/2010 | Weller | G06F 3/011 348/14.08 |
| 2010/0229125 A1* | 9/2010 | Cha | G06F 3/017 715/828 |
| 2010/0275159 A1* | 10/2010 | Matsubara | G06F 3/011 715/810 |
| 2010/0295781 A1* | 11/2010 | Alameh | G06F 3/0346 345/158 |
| 2010/0315336 A1* | 12/2010 | Butler | G06F 3/017 345/158 |
| 2011/0158546 A1* | 6/2011 | Huang | G06F 3/011 382/224 |
| 2012/0062736 A1* | 3/2012 | Xiong | G06F 3/017 348/143 |
| 2012/0154293 A1* | 6/2012 | Hinckley | G06F 1/1694 345/173 |
| 2012/0249741 A1* | 10/2012 | Maciocci | G06F 3/011 348/46 |
| 2013/0044061 A1* | 2/2013 | Ashbrook | G06F 3/0418 345/173 |
| 2013/0271397 A1* | 10/2013 | MacDougall | G06F 3/0304 345/173 |
| 2013/0300650 A1* | 11/2013 | Liu | G06F 3/011 345/156 |
| 2014/0010441 A1* | 1/2014 | Shamaie | G06K 9/00355 382/164 |
| 2014/0149754 A1* | 5/2014 | Silva | G06F 1/3212 713/300 |
| 2014/0368441 A1* | 12/2014 | Touloumtzis | G06F 3/017 345/173 |
| 2015/0123901 A1* | 5/2015 | Schwesinger | G06F 3/011 345/158 |
| 2015/0234467 A1* | 8/2015 | Tachibana | G06F 3/017 715/863 |
| 2015/0253848 A1* | 9/2015 | Heubel | G06F 3/016 345/173 |

* cited by examiner

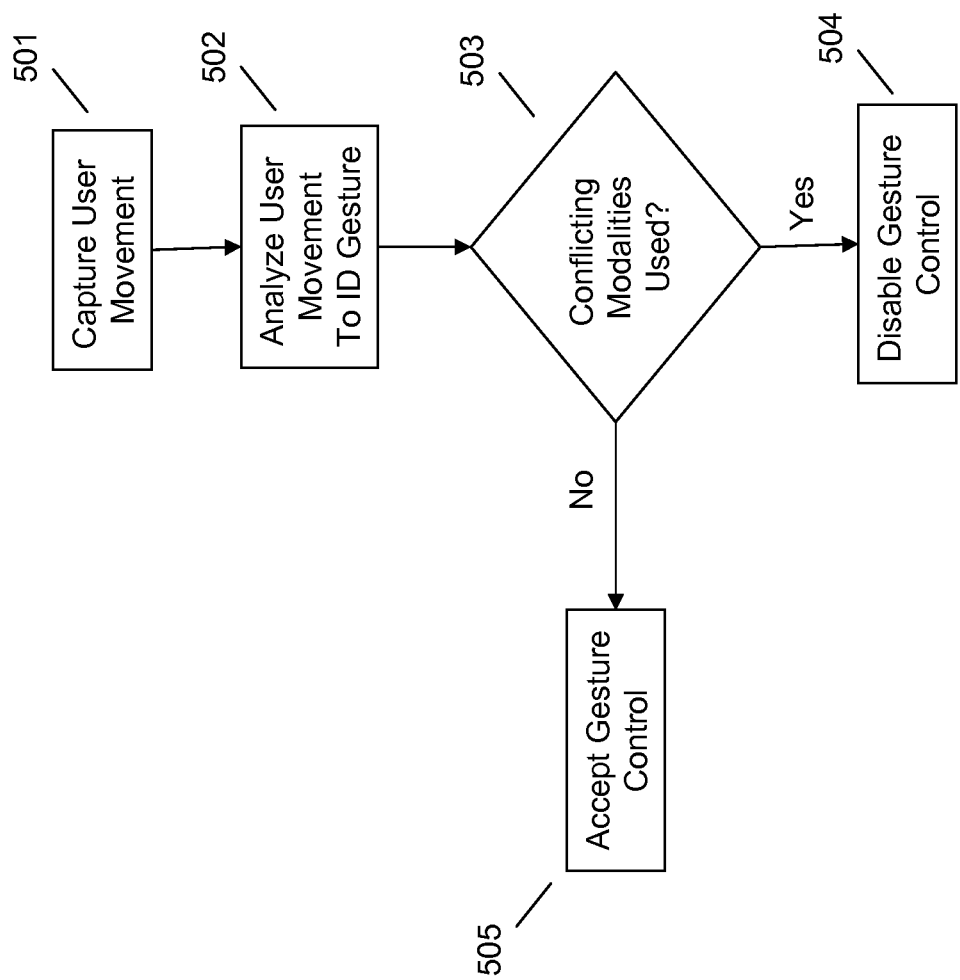

DETECTING INADVERTENT GESTURE CONTROLS

BACKGROUND

Gesture control allows a user to control a machine, e.g., a computer, gaming system, and the like, or application, e.g., video software, music software, word processing software, and the like, without the need for mechanical controls. The system is able to detect and recognize user movements and match those movements with an associated control, e.g., using a hand sweeping motion to advance a slide on a presentation, using a head turning motion to pause a movie, etc.

BRIEF SUMMARY

In summary, one aspect provides a method, comprising: capturing, using an image capture device, image data; analyzing, using a processor, the image data to identify a gesture control; determining, using a processor, the gesture control was inadvertent; and disregarding, using a processor, the gesture control.

Another aspect provides an apparatus, comprising: an image capture device; a processor operatively coupled to the image capture device; and a memory storing instructions that are executable by the processor to: capturing, using the image capture device, image data; analyze the image data to identify a gesture control; determine the gesture control was inadvertent; and disregard the gesture control.

A further aspect provides a product, comprising: a computer readable storage device storing code therewith, the code being executable by a processor and comprising: code that captures, using an image capture device, image data; code that analyzes, using a processor, the image data to identify a gesture control; code that determines, using a processor, the gesture control was inadvertent; and code that disregards, using a processor, the gesture control.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 5 illustrates another example method of detecting inadvertent gesture controls.

DETAILED DESCRIPTION

Figure 1:
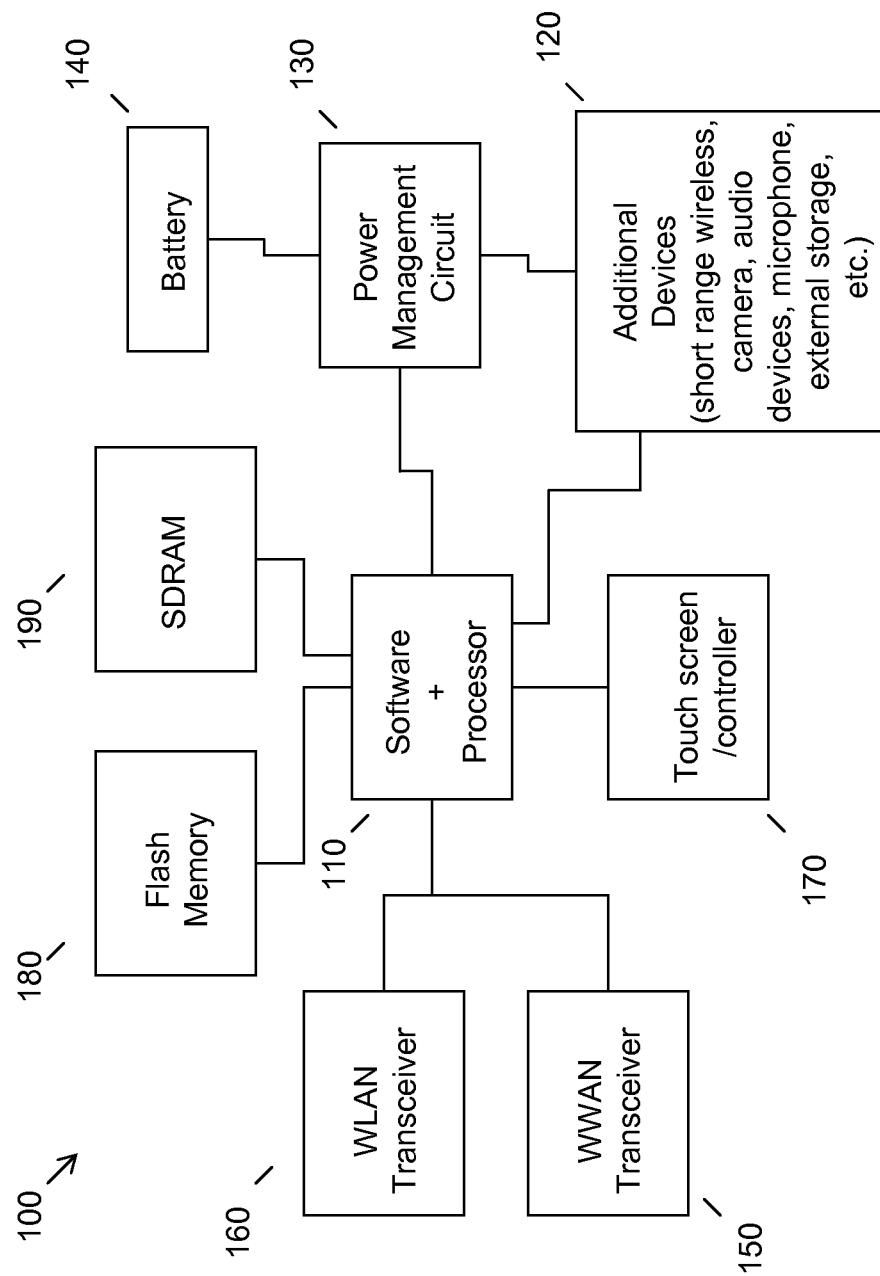
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Current systems using gesture control capture all activity by the user and attempt to translate those movements into machine or application control, even if the user does not intend those movements to control the machine or application. Unintentional activation in gesture control systems causes serious usability issues. By way of example, a user may be watching a video and something occurs causing the user to turn their head. The gesture control system may interpret this as the motion to pause the movie, even if the user did not intend this to occur. As another example, the gesture control system may be activated and change the slide on a presentation because the user waved their hand at another person entering the room, even though the user never intended this action to cause the gesture control system to be activated.

Accordingly, an embodiment provides a method of analyzing and determining that a user movement was not intended to activate the gesture control system or control the application that is running on the system. An embodiment may then disable (e.g., ignore, disregard) that gesture control command and will not activate the system or respond thereto. An embodiment thus allows the users of gesture control systems to interact with the environment outside of the system without activating the gesture control system inadvertently.

By way of example, an embodiment may characterize a user's body motion in an attempt to identify an inadvertent gesture input context. For certain body motions or patterns, camera gesture input should be either disabled or disabled for a threshold time window. Thus, for example, if a user's nose or eyes is/are moving over a threshold range, i.e., a pattern or motion indicative of an inadvertent input context, then the camera gesture may be disabled for a threshold period of time such that gesture inputs that would otherwise be recognized and acted on by the system are disregarded.

In another example embodiment, certain gestures may be disabled for a threshold period of time after system has received a certain kind of input. For example, after a swipe left camera gesture, e.g., in a music player application to move to next song in a list, a swipe right gesture may be disabled for a threshold period of time. Another example is that after a keyboard input is received, gesture inputs may be disabled for a threshold period of time. In this way, an embodiment may detect an inadvertent input context via positive processing of immediate prior inputs, whether they are gesture inputs or inputs using other input components.

In an embodiment, other context information may enable/disable gesture inputs. As an example, in a POWERPOINT or slideshow application, mouse control gestures may be disabled in a page without a clickable content. Thus, an aspect of the underlying application content may provide contextual data allowing the system to detect an inadvertent input context, i.e., gesture mouse controls should not be supplied in this context.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system design found for example in tablet or other mobile computing platforms. Software and processor(s) are combined in a single unit 110. Processors comprise internal arithmetic units, registers, cache memory, busses, I/O ports, etc., as is well known in the art. Internal busses and the like depend on different vendors, but essentially all the peripheral devices (120) may attach to a single unit 110. The circuitry 100 combines the processor, memory control, and I/O controller hub all into a single unit 110. Also, systems 100 of this type do not typically use SATA or PCI or LPC. Common interfaces, for example, include SDIO and I²C.

There are power management unit(s) 130, e.g., a battery management unit, BMU, which manage power as supplied, for example, via a rechargeable battery 140, which may be recharged by a connection to a power source (not shown). In at least one design, a single unit, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additional devices 120 are commonly included, e.g., an image capture device such as a camera that may provide data to a gesture input system, as described herein. System 100 often includes a touch screen 170 for data input and display/rendering. System 100 also typically includes various memory devices, for example flash memory 180 and SDRAM 190.

Figure 2:
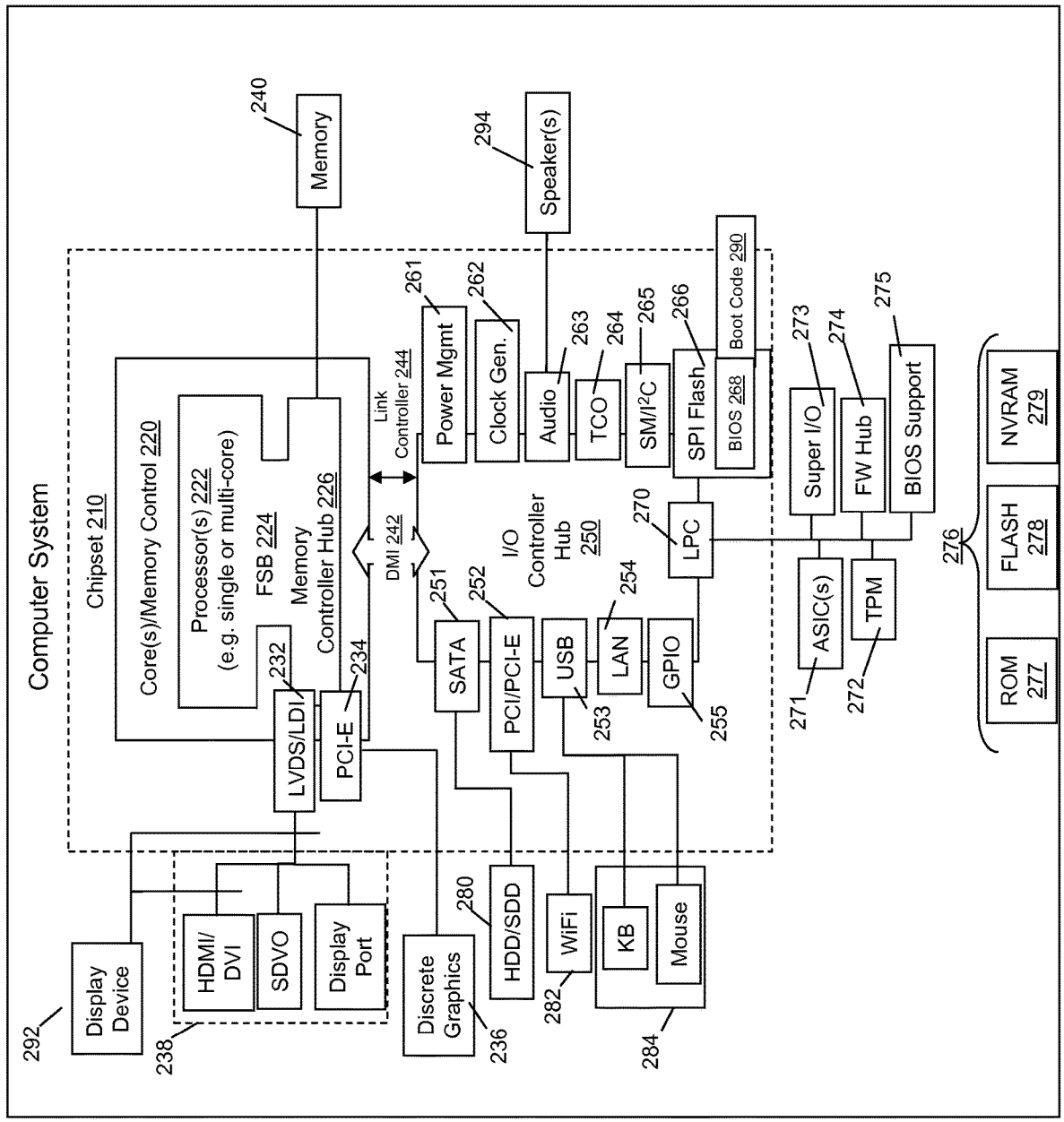
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 2, may be used in a system including gesture control technology, e.g. such as a computer, tablet, smart phone, etc. For example, a device may include a gesture control system that uses an image capture device, e.g. a camera 120, and appropriate software executed by a processor, e.g., 110, included with circuitry as outlined in the example of FIG. 1 and/or FIG. 2, such that a user may provide gesture inputs to control an application running on a device such as a tablet or laptop computer, etc.

Figure 3:
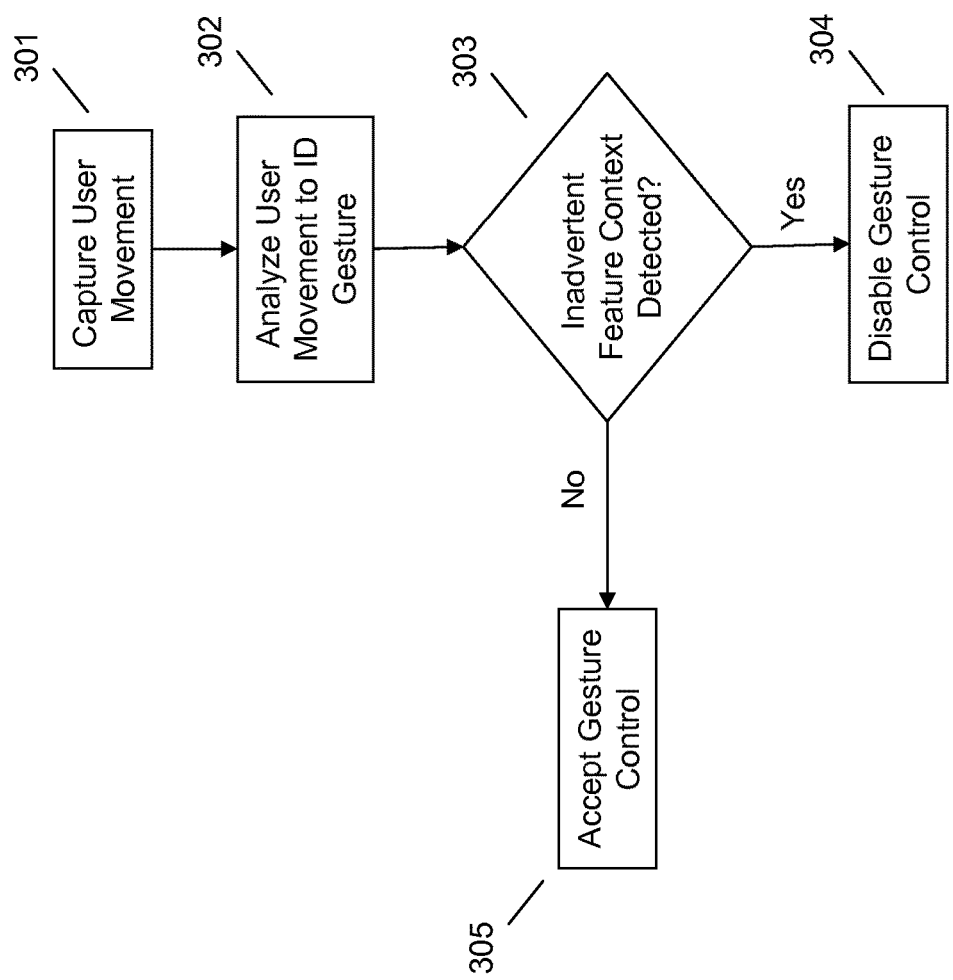
FIG. 3 illustrates an example method of detecting inadvertent gesture controls.

Referring to FIG. 3, an embodiment may use an image capture device, e.g., such as a camera included on a smart phone, a camera associated with a computer system, or the like, to capture user movement at 301, e.g., an eye movement, a hand motion, a head turn, etc, that typically may be associated with gesture control. At 302, an embodiment may then analyze, e.g., using a processor of a device such as a computer, tablet, or smart phone or component thereof, e.g., firmware associated with the image capture device, the image data captured, e.g., the user movement, in an attempt to determine if the user movement should be accepted as a gesture input, even if it typically would map to a predetermined gesture.

In an embodiment, the analyzing at 302 may include comparing a user's feature location, e.g., eye location, nose location, hand location, head location, etc., to a predetermined feature location threshold. By way of example, the gesture control software may include a threshold range for feature location, e.g., with respect to the top of the monitor, a specified distance from the sensor or image capture device, etc. This threshold range for feature location may be a preloaded value and/or it may be changed, e.g., user defined or dynamically updated during use. For example, the default feature location threshold from the screen may be three feet. However, the user may manually change this to a different distance.

The system may then determine at 303 if the user movement was inadvertent by detecting that it took place in an inadvertent feature context, e.g., determining whether the user intended to control the application by using the analysis of the user movement at 302 to ascertain if the purported gesture input occurred within an acceptable threshold range for feature location. By way of example, an embodiment may determine whether the user's feature was outside of the threshold range, e.g., the user's nose was not within a predetermined distance range with respect to the top of the monitor. If the user's feature was within the threshold range, e.g., the user's nose is within a predetermined range of the top of the monitor, then an embodiment may accept the gesture control at 305 and complete the action associated with the gesture, e.g., the user's hand was moved in a left to right motion to advance the slide of a presentation. If the user's feature was outside the threshold range, e.g., the user's nose is further than, for example, three feet, from the monitor, then an embodiment would not act on the gesture, although it has been detected. Thus, an embodiment may disregard the gesture in a variety of ways, e.g., by disabling gesture control at 304. This condition may persist as long as the inadvertent input condition persists, e.g., an embodiment may continue to ignore all movements made by the user, even if they map to gesture controls, while the feature of the user is outside the specified threshold range.

Figure 4:
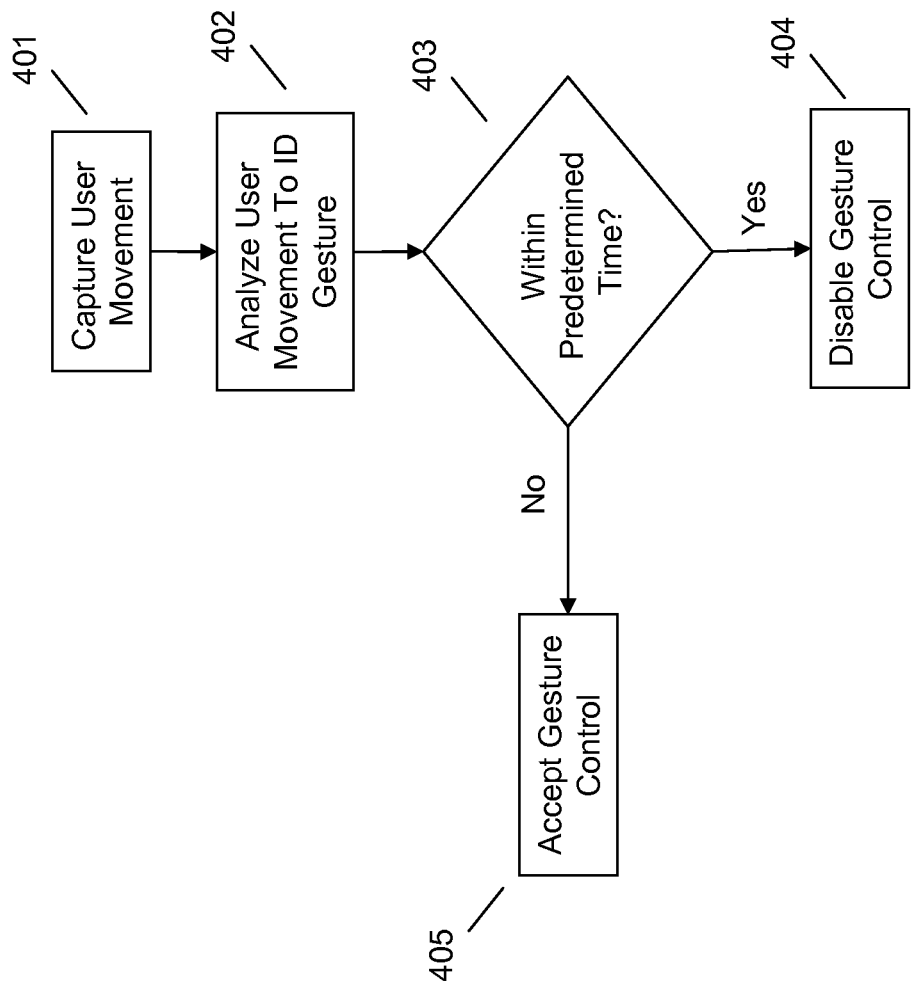
FIG. 4 illustrates another example method of detecting inadvertent gesture controls.

An embodiment may determine that a user gesture input in user movement was inadvertent by comparing the user movement to a preset time range. For example, referring to FIG. 4, an embodiment may capture a user movement at 401, e.g., a hand wave from left to right that may be associated with advancing to the next song in a music application. The embodiment may then analyze that user movement at 402 and determine at 403 that the user movement was provided within a predetermined time compared with a previously received gesture input. An embodiment may then categorize the current gesture input captured at 401 and detected at 402 as an additional gesture input, e.g., following within a predetermined time a hand wave from right to left.

The system may thus determine that this additional gesture input, although faithfully detected and actionable, is likely inadvertent gesture input at 403. This may be accomplished by comparing the time between the initial gesture input and this additional gesture input and determining at 403 that these have occurred within a predetermined time range. This time range may be a default range preloaded into the application, or it may be changed, e.g., user defined or learned from past user behavior.

For example, the default time range may be five seconds between actions or it may be changed by the user. The system may therefore determine at 403 that this second gesture input was received within the predetermined time threshold, e.g., 5 seconds, and disable gesture control at 404. In other words, for example, if the time between the initial gesture input and the additional gesture input was five seconds or less, in this non-limiting example, an embodiment ignores the additional gesture input and does not act upon that additional gesture input. However, if the system determined at 403 that the time between the two gesture inputs was greater than, for example, five seconds, then an embodiment accepts the second gesture control at 405, e.g., completes the action associated with the gesture input.

An embodiment may determine that a user movement was inadvertent by considering if different input modalities used by the user to input system controls conflict. For example, and referring to FIG. 5, an embodiment may capture a user movement at 501 that contains a user gesture input, e.g., a hand movement associated with a gesture control such as pausing a video. An embodiment may then analyze at 502 the user movement and determine at 503 whether the user movement was inadvertent via determining if the gesture input conflicts with input received via another input modality.

For example, to determine if the user movement was inadvertent at 503, an embodiment may compare the time between the user input through another input device, e.g. a mouse, and the user gesture input, e.g., a hand movement, to a preset time range, e.g. three seconds. This time range may again be a preset by default in the system or may be changed, e.g., modified by the user. By taking into account this context, the system may then determine at 503 that the user movement was below the preset time threshold and may disable gesture control at 504 for that movement. In other words, for example, the system may get an input from a secondary input device, e.g., the user may click with the mouse, and then the system may capture a user gesture movement, e.g., a hand movement, within three seconds of the input from the secondary input device. The system may then ignore this user gesture and not complete the action associated with the user movement, thus prioritizing the first input in time. An embodiment may prioritize inputs in a variety of ways, e.g., depending on modality that is preferred by system default or user preference. If the system determines at 503 that the user movement was outside the preset time threshold, e.g., the hand movement was more than three seconds after the mouse click, it may accept the gesture input at 505, e.g., the system will complete the action associated with the gesture input.

Thus, an embodiment may determine that a user movement was inadvertent by determining, by using the context of the user movement, that the context does not support such a user movement being counted as a valid gesture input. For example, the system may analyze purported gesture inputs and determine whether these are inadvertent based on the underlying application to be controlled. By way of non-limiting example, for a gesture input for selecting a link, an embodiment may disregard this gesture input, although faithfully identified, if the underlying application does not have a link that could be selected.

An example of context analysis may be determining what application is to be controlled, e.g. a webcast that allows no user interaction versus a presentation that does allow user interaction. Another example of context analysis may be determining whether that application can support the control associated with a specific movement, e.g., a finger movement associated with selecting a link in an application that has no link to select versus a head turn associated with advancing the song in a music application. An additional example of context analysis may be determining whether a user movement is associated with any control within the system, e.g., flailing of the arms has no control associated with it in the gesture control system versus a head turn that does have a control associated with it in the gesture control system.

The system may determine that, based on the context of the user movement, the context does not support such a user movement, e.g., the application has no link that can be selected, and will disable gesture control. Alternatively, the system may determine that, based on the context of the user movement, the context does support such a user movement, e.g., the application has a link that can be selected, and would therefore accept the gesture control. This acceptance of gesture input may be done in connection with other contextual checks for inadvertent input, e.g., timing, such that an embodiment may perform multiple checks of a gesture input prior to executing an action responsive thereto.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    capturing, using an image capture device, image data provided within a gesture input field;
    analyzing, using a processor, the image data to determine that the image data corresponds to a gesture control associated with a user movement, wherein the analyzing comprises comparing a feature location of a user providing the image data to a predetermined feature location threshold;
    determining from the user movement, using a processor, the gesture control was inadvertent, wherein the determining comprises determining the feature location is outside the predetermined feature location threshold;
    disregarding, based upon the gesture control being inadvertent, the gesture control provided within the gesture input field, wherein the disregarding comprises not activating a gesture control system; and
    thereafter disabling the gesture control system following the determining the gesture control was inadvertent, wherein the disabling comprises disabling the gesture control system while the feature location is outside the predetermined feature location threshold.

2. The method of claim 1, wherein a feature is associated with a body part of a user.

3. The method of claim 2, wherein the feature location is selected from the group consisting of a nose location, an eye location, a hand location, and a head location.

4. The method of claim 1, comprising:
    capturing, using an image capture device, other image data; and analyzing the other image data to identify another gesture control;

wherein:

the determining further comprises determining a time between receipt of the gesture control and the another gesture control is below a predetermined time threshold.

5. The method of claim 1, comprising:

detecting, using a processor, a user input provided through a non-gesture input device;

wherein the determining further comprises determining a conflict between the gesture control and the user input provided through a non-gesture input device.

6. The method of claim 5, wherein the non-gesture input device is selected from the group consisting of a mouse, a keyboard, a voice input component, and a touch screen.

7. The method of claim 1, further comprising:

accessing underlying application context data;

wherein the determining further comprises determining the gesture control conflicts with the underlying application context data.

8. The method of claim 7, wherein the underlying application context data is derived from an underlying application controllable by gesture input.

9. The method of claim 7, wherein the underlying application context data is derived from an underlying application not controllable by gesture input.

10. The method of claim 1, wherein the determining comprises conducting at least two checks for context conflict between the identified gesture control and available context data.

11. An apparatus, comprising:

an image capture device;

a processor operatively coupled to the image capture device; and a memory storing instructions that are executable by the processor to:

capture, using the image capture device, image data;

analyze the image data to determine that the image data corresponds to a gesture control associated with a user movement, wherein to analyze comprises comparing a feature location of a user providing the image data to a predetermined feature location threshold;

determine from the user movement the gesture control was inadvertent, wherein to determine comprises determining the feature location is outside the predetermined feature location threshold;

disregard, based upon the gesture control being inadvertent, the gesture control provided within the gesture input field, wherein to disregard comprises not activating a gesture control system; and thereafter disable the gesture control system following the determining the gesture control was inadvertent, wherein the disabling comprises disabling the gesture control system while the feature location is outside the predetermined feature location threshold.

12. The apparatus of claim 11, wherein a feature is associated with a body part of a user.

13. The apparatus of claim 12, wherein the feature location is selected from the group consisting of a nose location, an eye location, a hand location, and a head location.

14. The apparatus of claim 11, wherein the instructions are further executable by the processor to:

capture, using the image capture device, other image data; and analyze the other image data to identify another gesture control;

wherein:

to determine further comprises determining a time between receipt of the gesture control and the another gesture control is below a predetermined time threshold.

15. The apparatus of claim 11, wherein the instructions are further executable by the processor to:

detect a user input provided through a non-gesture input device;

wherein to determine further comprises determining a conflict between the gesture control and the user input provided through a non-gesture input device.

16. The apparatus of claim 15, wherein the non-gesture input device is selected from the group consisting of a mouse, a keyboard, a voice input component, and a touch screen.

17. The apparatus of claim 11, wherein the instructions are further executable by the processor to:

access underlying application context data;

wherein to determine further comprises determining the gesture control conflicts with the underlying application context data.

18. The apparatus of claim 17, wherein the underlying application context data is derived from an underlying application controllable by gesture input.

19. The apparatus of claim 17, wherein the underlying application context data is derived from an underlying application not controllable by gesture input.

20. A product, comprising: a non-transitory computer readable storage device storing code therewith, the code being executable by a processor and comprising: code that captures, using an image capture device, image data; code that analyzes, using a processor, the image data to identify a gesture control wherein the code that analyzes comprises code that compares a feature location of a user providing the image data to a predetermined feature location threshold; code that determines, using a processor, the gesture control was inadvertent, wherein the code that determines comprises code that determines the feature location is outside the predetermined feature location threshold; code that disregards, using a processor and based upon the gesture control being inadvertent the gesture control provided within the gesture input field, wherein the disregarding comprises not activating a gesture control system; and code that thereafter disables the gesture control system following the determining the gesture control was inadvertent, wherein the code that disables comprises code that disables the gesture control system while the feature location is outside the predetermined feature location threshold.

* * * * *